US008562147B2

(12) United States Patent
Chang et al.

(10) Patent No.: US 8,562,147 B2
(45) Date of Patent: Oct. 22, 2013

(54) REMOTE-CONTROLLED PROJECTOR WITH OBSTACLE DETECTING CAPABILITY

(75) Inventors: Wei-Chun Chang, Taipei County (TW); Hsien-Chun Tsou, Taoyuan County (TW); Wei-Chun Huang, Taoyuan County (TW); Hung-Yen Huang, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 300 days.

(21) Appl. No.: 12/824,228

(22) Filed: Jun. 28, 2010

(65) Prior Publication Data
US 2010/0328624 A1   Dec. 30, 2010

(30) Foreign Application Priority Data

Jun. 30, 2009 (TW) .............................. 98122115 A

(51) Int. Cl.
*G03B 21/20* (2006.01)
*G03B 21/26* (2006.01)

(52) U.S. Cl.
USPC .............................................. 353/85; 353/28

(58) Field of Classification Search
USPC .......... 353/28, 85, 122, 30, 31; 348/739, 744; 356/3, 4.01; 250/338.1, 339.06, 250/339.11, 341.8, 559.29, 214 R, 559.04
See application file for complete search history.

(56) References Cited

U.S. PATENT DOCUMENTS

| 6,460,999 | B1 * | 10/2002 | Suzuki | ............................. 353/79 |
| 6,558,002 | B1 * | 5/2003 | Miyashita | ....................... 353/42 |
| 6,575,581 | B2 | 6/2003 | Tsurushima | |

FOREIGN PATENT DOCUMENTS

| JP | 06-347748 A | 12/1994 |
| JP | 06347748 | 12/1994 |
| JP | 2001008053 A | 1/2001 |
| TW | 232346 B2 | 5/2005 |
| TW | 200723728 A | 6/2007 |

OTHER PUBLICATIONS

Office Action of Counterpart application by China Patent Office on Mar. 17, 2010.
Office Action of counterpart application by Taiwan Intellectual Property Office on Nov. 27, 2012.

* cited by examiner

*Primary Examiner* — Pascal M Bui Pho

(57) ABSTRACT

A projector including a lens, an IR emission circuit, an IR reception circuit and a central processing circuit is provided. The projector is controlled by a first infrared ray (IR) signal provided by a remote controller. The IR emission circuit emits a second IR signal to detect whether an obstacle is positioned on an optical path of the projection light. When an obstacle is positioned on the optical path, the second IR signal is reflected to the IR reception circuit via the obstacle. The IR reception circuit provides a first and a second output signal in response to the first and the second IR signal respectively. The central processing circuit determines that an obstacle is positioned on the optical path and accordingly alters an operational mode of the projector in response to the second output signal and controls the operation of the projector in response to the first output signal.

14 Claims, 4 Drawing Sheets

REMOTE-CONTROLLED PROJECTOR WITH OBSTACLE DETECTING CAPABILITY

This application claims the benefit of Taiwan application Serial No. 098122115, filed Jun. 30, 2009, the subject matter of which is incorporated herein by reference.

BACKGROUND OF THE INVENTION

1. Field of the Invention

The invention relates in general to a projector, and more particularly to a projector which provides an IR signal to detect whether an obstacle is positioned on an optical path of the projection light.

2. Description of the Related Art

In general, the projector includes a housing, a light engine and a light source. The light generated by the light source is projected to the light engine, which guides the light to the lens to project an image on the screen.

In the briefing, switching the operation mode of the projector is often required to users. Users often place an obstacle (such as a book or a piece of paper) in front of the lens of the projector to temporarily block the light projected via the lens of the projector in a simple way. However, the projection light of the projector has a certain level of intensity, and when the projection light of the projector is blocked by an obstacle, the projection light may be easily reflected to the lens of the projector and makes the lens overheated or even damaged.

Japanese Patent Publication No. 06-347748 discloses a technology of using a light emitter and a light receiver to detect whether an obstacle is positioned on the optical path of the projection light. In greater details, the light emitter emits a light signal, which is reflected to the light receiver via the obstacle on the optical path of the projection light. Thus, whether an obstacle is positioned on the optical path of the projection light can be determined according to the signal received by the light receiver. However, the light receiver disclosed in the prior art is merely for receiving the light signal provided by the light emitter. In other words, the only function of the light receiver is to receive the reflected light signal.

SUMMARY OF THE INVENTION

The invention is directed to a projector using an infrared ray (IR) signal provided by an IR emission circuit during a particular period. When an obstacle of the projector is positioned on the optical path of the projection light, the IR signal is reflected to the IR reception circuit via the obstacle. The projector of the invention further uses the IR reception circuit to receive an IR signal provided by a remote controller of the projector. Thus, the projector of the invention is capable of detecting whether an obstacle is positioned on the optical path of the projection light and accordingly switching an operational mode of the projector according to the signal received by an IR reception circuit.

According to a first aspect of the present invention, a projector including a lens, an IR emission circuit, a first IR reception circuit and a central processing circuit is provided. The projector is controlled by a first infrared ray (IR) signal provided by a remote controller. The IR emission circuit emits a second IR signal to detect whether an obstacle is positioned on an optical path of the projection light. The first IR reception circuit includes a first output end and a first IR receiver, which is electrically connected to the first output end. The first IR receiver provides a first output signal in response to the first IR signal via the first output end. When an obstacle is positioned on the optical path, the second IR signal is reflected to the first IR receiver via the obstacle. The first IR receiver provides a first output signal and a second output signal in response to the second IR signal via the first output end. The central processing circuit is coupled to the first output end and alters an operational mode of the projector based on the first output signal.

The invention will become apparent from the following detailed description of the preferred but non-limiting embodiments. The following description is made with reference to the accompanying drawings.

DETAILED DESCRIPTION OF THE INVENTION

The projector of the present embodiment of the invention emits an IR signal by an IR emission circuit to detect whether an obstacle is positioned on an optical path of the projection light.

Figure 1:
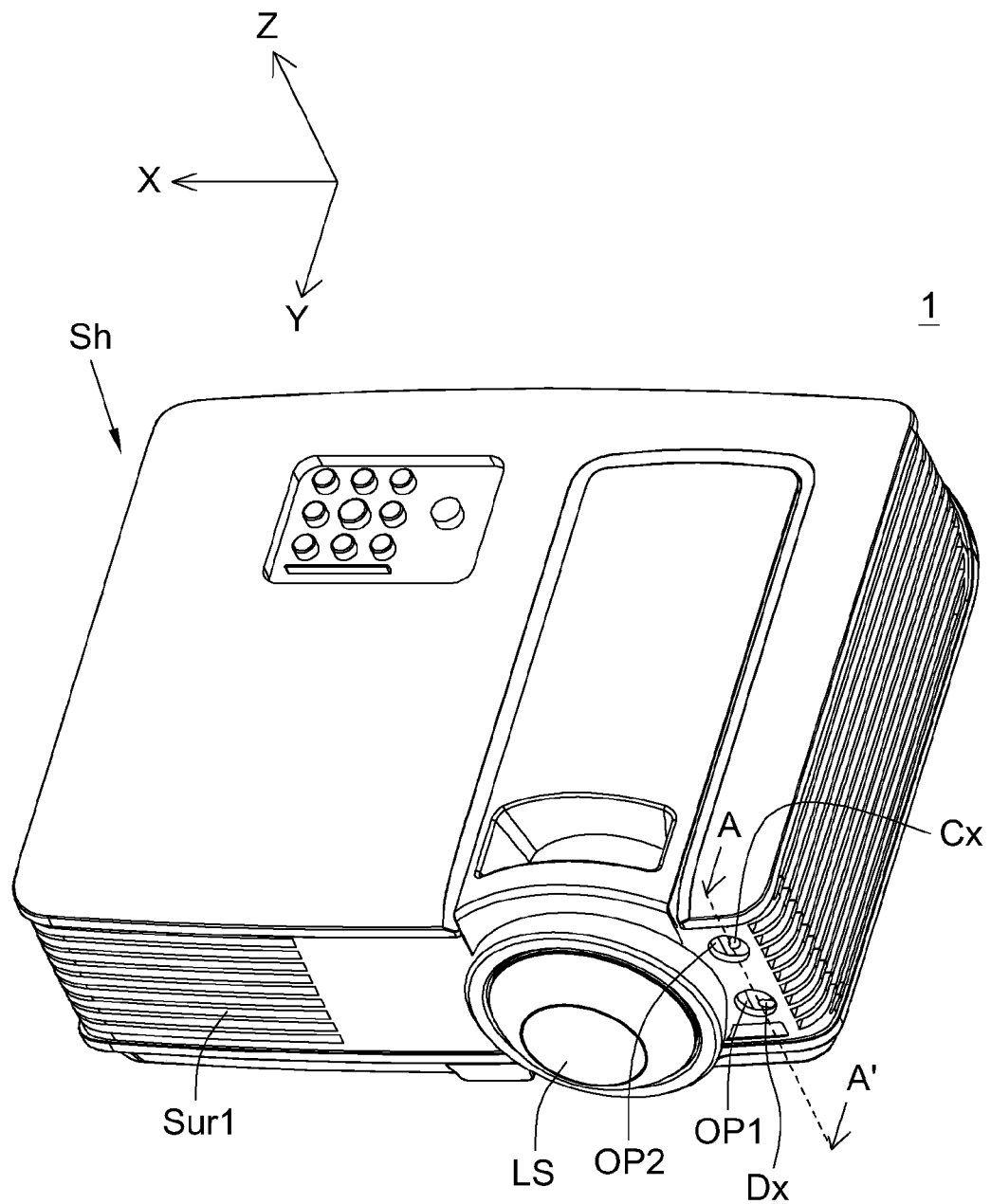
FIG. 1 shows a projector according to an embodiment of the invention.
Figure 2:
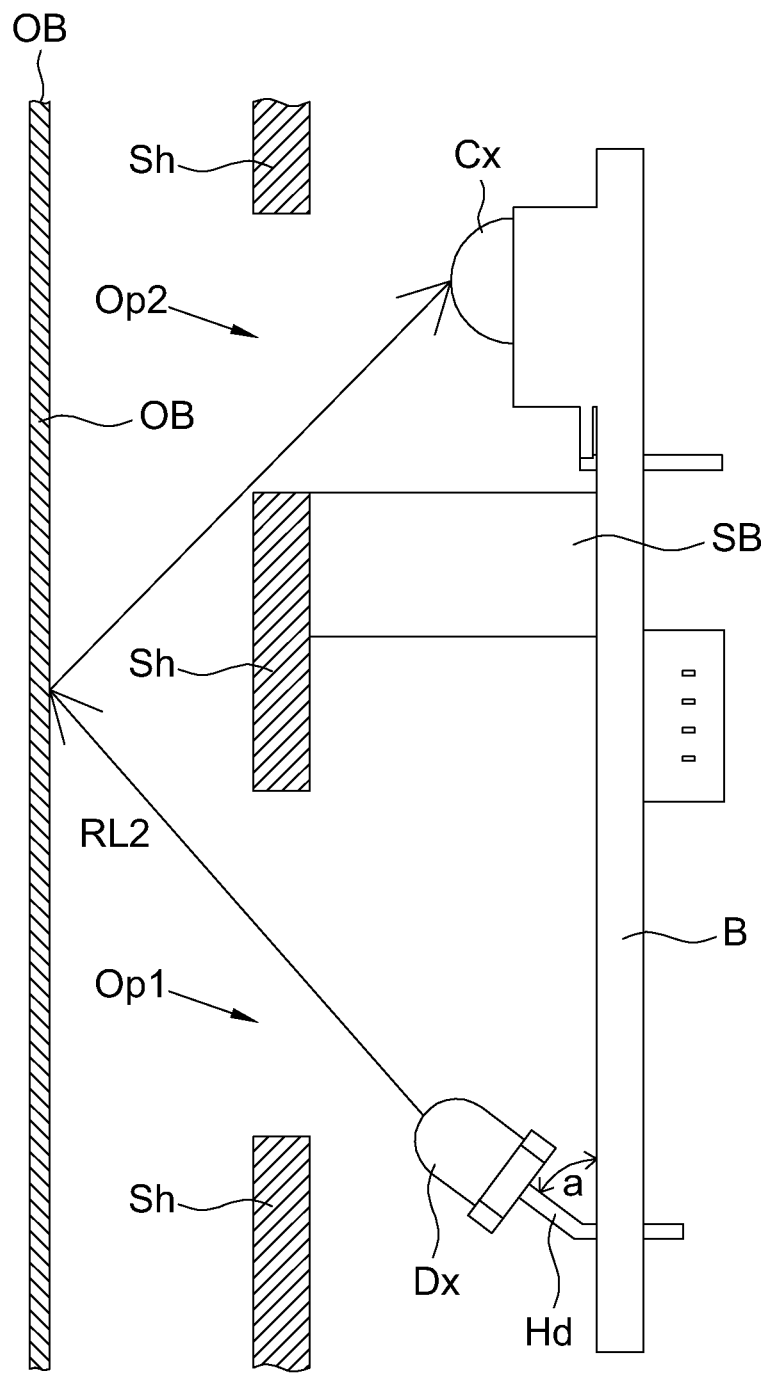
FIG. 2 shows a cross-sectional view along the cross-sectional line AA' of FIG. 1.

Referring to FIG. 1 and FIG. 2. FIG. 1 shows a projector according to an embodiment of the invention. FIG. 2 shows a cross-sectional view along the cross-sectional line AA' of FIG. 1. The projector 1 includes a lens LS and a housing Sh. The housing Sh has a surface Sur1 on which the lens LS is disposed. In the present embodiment, the surface Sur1 includes openings Op1 and Op2. The projector 1 further includes a circuit board B, an IR emission circuit and a first IR reception circuit. For example, the IR emission circuit and the first IR reception circuit include an IR emitter Dx and a first IR receiver Cx respectively, the IR emitter Dx and the first IR receiver Cx are respectively disposed on the circuit board B parallel to the surface Sur1, the IR emitter Dx emits a second IR signal via the opening Op1 and the first IR receiver Cx receives a first IR signal via the opening Op2.

In other examples, the IR emitter Dx and the first IR receiver Cx can also be embedded on the housing Sh surface. Thus, the second IR signal provided by the IR emitter Dx does not have to pass through the opening Op1, and the first IR signal received by the first IR receiver Cx does not have to pass through the opening Op2 either.

In an embodiment, a fixing element Hd is disposed on the circuit board B for locating the IR emitter Dx on the circuit board B. An acute angle facing the first IR reception circuit is between the fixing element Hd and the circuit board B. In an example, the projector 1 further includes an isolating element SB, such as an elastomer or a blocker, disposed on the circuit board B to avoid the first IR reception circuit receiving the second IR signal provided by the IR emitter Dx along the optical path inside the housing Sh. In general, due to the tolerance in assembly, the gap between the housing Sh and the circuit board B is not exactly the same for different projectors, so the isolating element is preferably formed by an elastomer. For example, the elastomer can be realized by a sponge. In general, black color provides superior light blocking effect, so the elastomer is preferably realized by a black sponge.

Figure 3:
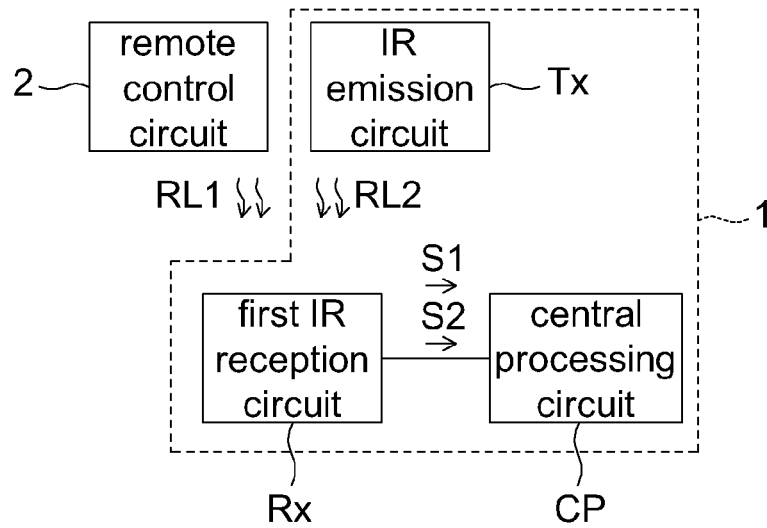
FIG. 3 shows a block diagram of a projector according to an embodiment of the invention.
Figure 4:
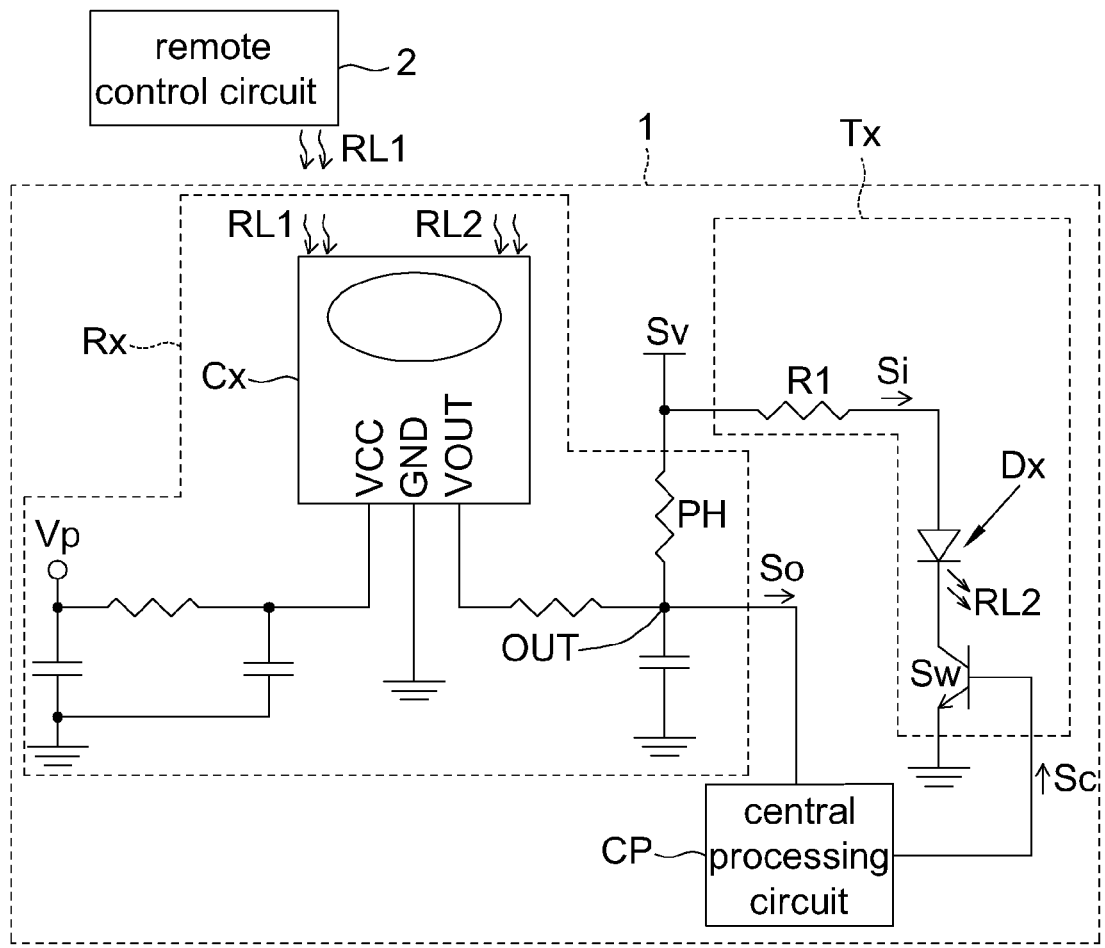
FIG. 4 shows a detailed block diagram of the projector of FIG. 3.

Referring to FIG. 3 and FIG. 4. FIG. 3 shows a block diagram of a projector according to an embodiment of the invention. FIG. 4 shows a detailed block diagram of the projector of FIG. 3. The projector 1 is controlled by a remote controller 2. The remote controller 2 such as emits a third IR signal RL1 for transmitting a control command to the projector 1 to control the operation of the projector 1. For example, the third IR signal RL1 includes a number of remote control unit (REM) frame structures, each transmitting a control command. For example, the length of the REM frame structure ranges 90~126 milliseconds (ms), and the carrier frequency is 38 kilohertz (KHz).

The IR emission circuit Tx emits a second IR signal RL2 to detect whether an obstacle is positioned on the part of the optical path of the projection light within a detection distance to the lens LS. For example, if the obstacle OB is positioned on the part of optical path of the projection light within a detection distance to the lens LS, then the second IR signal RL2 is reflected to the first IR reception circuit Rx via the obstacle OB.

For example, the IR emission circuit Tx includes a power supplying circuit, an IR emitter Dx and a switch Sw. The power supplying circuit includes a resistor R1. The resistor R1 provides a current signal Si in response to the voltage signal Sv such as the maximum power voltage VDD of the circuit. Due to the level of the voltage signal Sv, the cross-voltage at the two ends of the IR emitter Dx and the cross-voltage at the two output ends of the switch Sw substantially both are a fixed value, and so is the cross-voltage at the two ends of the resistor R1 substantially a fixed value. Thus, the intensity of the current signal Si, the emission intensity (relevant to the intensity of the current signal Si) of the second IR signal RL2 and the detection distance (relevant to the emission intensity of the second IR signal RL2) can be determined by adjusting the resistance of the resistor R1.

For example, the IR emitter Dx is realized by a light emitting diode (LED) circuit which generates the second IR signal RL2 in response to the current signal Si. The switch Sw, in response to the control signal Sc, drives the IR emitter Dx to emit the second IR signal RL2 during the first period and disables IR emitter Dx to stop emitting the second IR signal RL2 during the second period. The control signal Sc is provided by a central processing circuit CP for switching the switch Sw at a fixed frequency during the first period TP1 as indicated in FIG. 4. Thus, during the first period TP1, the IR emitter Dx generates an IR pulse signal oscillating at the fixed frequency in response to the control signal Sc. For example, the second IR signal RL2 is a 38-KHz pulse signal. During the second period TP2, the control signal Sc continuously disables the switch Sw, so that the second IR signal RL2 continuously has a disabling level during the second period TP2.

The first IR reception circuit Rx has a first output end OUT, which is electrically connected by the first IR receiver. Via the first output end OUT, a second output signal S2 is provided in response to the second IR signal RL2 reflected via the obstacle OB. The first IR reception circuit Rx further provides a first output signal S1 via the first output end OUT in response to the third IR signal RL1 provided by the remote controller 2.

Figure 5:
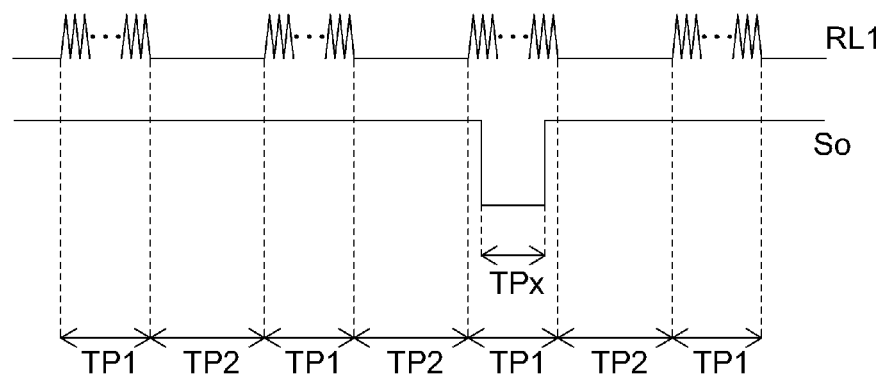
FIG. 5 shows a timing diagram for relevant signals of each circuit of FIG. 3.

For example, the first IR reception circuit Rx includes a first IR receiver Cx and a level shifting circuit PH. For example, the first IR receiver Cx includes a bandpass filter. The level shifting circuit PH boosts the signal So at the first output end OUT to a high signal level before the bandpass filter controls the signal So. When receiving the signal having the pass band frequency, the bandpass filter determines that the signal So at the first output end OUT has a low signal level as indicated in the wave pattern of a sub-period TPx of a first period TP1 of FIG. 5. The pass band of the bandpass filter corresponds to the frequency of the IR pulse signal (that is, the second IR signal RL2) generated by the IR emitter Dx. Thus, when the second IR signal RL2 generated by the IR emission circuit Tx is reflected to the first IR receiver Cx via an obstacle OB, the bandpass filter steps down the signal So at the first output end OUT to a low signal level in response to the second IR signal RL2. For example, the second output signal S2 is the signal So which continuously has had the low signal level for N first periods TP1, wherein N is a natural number.

The pass band frequency of the bandpass filter also corresponds to the carrier frequency of the third IR signal RL1. Thus, when the bandpass filter receives the third IR signal RL1 provided by the remote controller 2, the bandpass filter and the level shifting circuit PH, in response to third IR signal RL1, switch the signal So between a high signal level and the low signal level to generate the first output signal S1 during the frame period length corresponding to the third IR signal RL1.

The central processing circuit CP is coupled to the first output end OUT. In response to the signal So, the central processing circuit CP continuously receives a signal with a low signal level (that is, the second output signal S2) for N first periods TP1 determines that an obstacle is positioned on the optical path OB of the projection light, and accordingly alters an operational mode of the projector 1, wherein N is a natural number. For example, the central processing circuit CP alters the projector 1 from a normal projection mode to a blank mode. In other examples, the central processing circuit CP can also alter the projector 1 from the normal projection mode to other modes such as a lamp power-saving mode or a shut-down mode.

For example, to avoid the central processing circuit CP being too sensitive in altering the operational mode of the projector 1 in response to an obstacle which only temporarily blocks the optical path, the digit N can be designed as a larger natural number.

In response to the signal So (that is, the first output signal S1) being continuously switched between the high signal and the low signal level during the frame period length, the central processing circuit CP further decodes the control command transmitted by the remote controller 2 via the third IR signal RL1. Thus, the central processing circuit CP can control the operation of the projector 1 according to the control command provided by the remote controller 2.

In an example, the length of the second period TP2 is relevant to the length of the REM frame structure of the third IR signal RL1. For example, the length of the second period TP2 is larger than M times of the frame period length, wherein M is a natural number larger than 1. Thus, despite the obstacle OB blocks the lens LS (the signal So is continuously stepped down to a low signal level by the bandpass filter during the first period TP1), the first IR reception circuit Rx still can receive the third IR signal RL1 during the second period TP2, and accordingly provide a first output signal S1 to the central processing circuit CP during the second period TP2. In other words, the first IR reception circuit Rx can complete the operation in response to the third IR signal RL1 provided by the remote controller 2 during the second period TP2 and complete the operation in response to the second IR signal RL2 provided by the IR emission circuit Tx during the first period TP1 in a time-division multiplexing manner.

Figure 6:
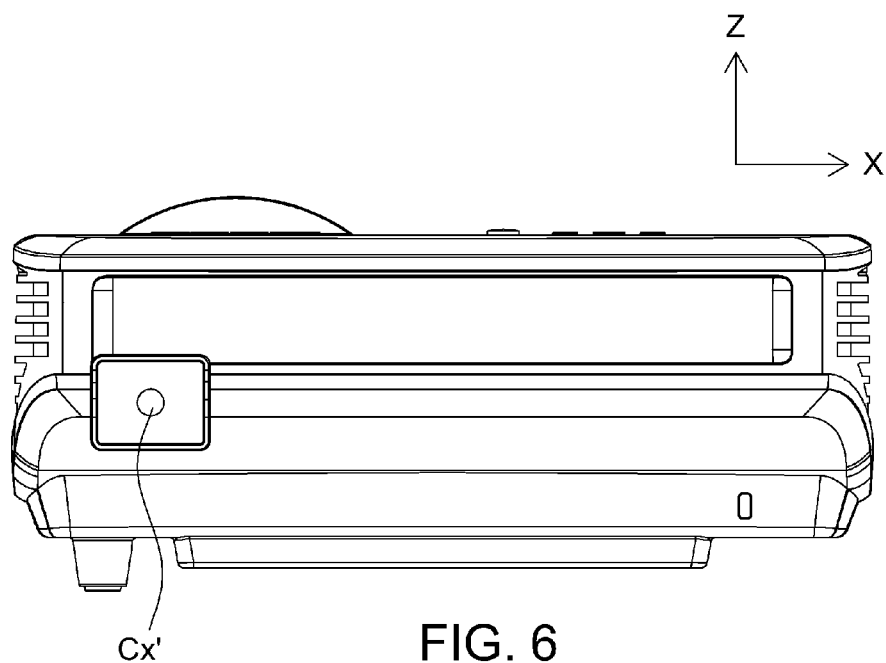
FIG. 6 shows another schematic diagram of the projector 1 according to the present embodiment of the invention.

Referring to FIG. 6, another schematic diagram of the projector 1 according to the present embodiment of the invention is shown. In an example, the projector 1 further includes another, e.g. a second IR reception circuit, which includes a second IR receiver Cx' disposed on a surface Sur2 of the housing Sh. In an example, the surface Sur2 corresponds to the surface Sur1, for example, the surface Sur1 is parallel to the surface Sur2. In other examples, the correspondence between the surface Sur2 and the surface Sur1 is not limited to the above exemplification.

In an example, the surface Sur2 includes an opening Op3, and the third IR signal RL1 can be emitted towards the second IR receiver Cx' via the opening Op3. In other examples, the second IR receiver Cx' can also be embedded on the surface Sur2. For example, the first IR reception circuit Rx and the second IR reception circuit have similar circuit structure, and a second output end of the second IR reception circuit is coupled to the first output end OUT and the central processing circuit CP. Thus, the central processing circuit CP can obtain a control command from the third IR signal RL1 received by the second IR reception circuit, and accordingly control the operation of the projector.

The projector of the present embodiment of the invention emits a second IR signal by an IR emission circuit during a particular period. When an obstacle of the projector is positioned on the optical path of the projection light, the second IR signal is reflected to the first IR receiver via the obstacle. The projector of the invention further uses the first IR reception circuit to receive a third IR signal provided by a remote controller of the projector. Thus, the projector of the invention is capable of detecting whether an obstacle is positioned on the optical path of the projection light and accordingly altering an operational mode of the projector according to the signal received by a first IR reception circuit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projector controlled by a control command of a first infra ray (IR) signal provided by a remote controller, the first IR signal having a frame period length, wherein the projector comprises:
   a lens;
   an IR emission circuit for emitting a second IR signal to detect whether an obstacle is positioned on an optical path of the projection light, wherein the IR emission circuit emits the second IR signal during a first period and stops emitting the second IR signal during a second period, the first period and the second period are periodically repeated, the second period is N times of the frame period length, and N is a natural number larger than 1;
   a first IR reception circuit, comprising:
   a first output end; and
   a first IR receiver electrically connected to the first output end, wherein the first IR receiver provides a first output signal in response to the first IR signal via the first output end, and when the obstacle is positioned on the optical path, the second IR signal is reflected to the first IR receiver via the obstacle, and the first IR receiver provides a second output signal in response to the second IR signal via the first output end; and
   a central processing circuit coupled to the first output end, wherein the central processing circuit alters an operational mode of the projector in response to the second output signal, and controls the projector based on the first output signal.

2. The projector according to claim 1, wherein the IR emission circuit comprises:
   a power supplying circuit providing a current signal;
   an IR emitter generating the second IR signal in response to the current signal; and
   a switch, in response to a control signal, enabling the IR emitter to emit the second IR signal during the first period and disabling the IR emitter during the second period;
   wherein the control signal is provided by the central processing circuit.

3. The projector according to claim 2, wherein the power supplying circuit comprises a resistor, which generates the current signal in response to a voltage signal.

4. The projector according to claim 3, wherein the resistor determines the intensity of the current signal and the emission intensity of the second IR signal.

5. The projector according to claim 1, wherein the first IR receiver comprises:
   a bandpass filter, in response to the second IR signal, controlling the first output end with a first signal level to provide as the second output signal during the first period.

6. The projector according to claim 5, wherein the central processing circuit determines that the second output signal is activated and alters the operational mode of the projector when the first signal level exists continuously for N first periods.

7. The projector according to claim 5, wherein the second IR signal is a pulse signal which continuously oscillates at a predetermined frequency during the first period, and the predetermined frequency falls within the pass band of the bandpass filter.

8. The projector according to claim 5, wherein the first IR reception circuit further comprises:
   a level shifting circuit controlling the first output end with a second signal level to provide as the first output signal.

9. The projector according to claim 1, further comprising:
   a housing having a first surface, wherein the IR emission circuit has an IR emitter for emitting the second IR signal, and the lens, the IR receiver and the IR emitter are all disposed on the first surface;
   a circuit board disposed in the housing, wherein both the IR emission circuit and the first IR reception circuit are disposed on the circuit board; and
   a fixing element locating the IR emission circuit on the circuit board, wherein an acute angle facing the first IR reception circuit is between the fixing element and the circuit board.

10. The projector according to claim 9, further comprising:
    an isolating element disposed on the circuit board to avoid the first IR reception circuit receiving the second IR signal inside the housing.

11. The projector according to claim 10, wherein the isolating element is an elastomer.

12. The projector according to claim 9, further comprising:
    a second IR reception circuit having a second IR receiver disposed on a second surface of the housing, wherein a third IR signal provided by the remote controller is emitted towards the second IR receiver, and the second IR reception circuit further has a second output end.

13. The projector according to claim 12, wherein the second output end is coupled to the first output end and the central processing circuit, and provides a third output signal to the central processing circuit via the second output end in response to the third IR signal, and the central processing circuit controls the projector based on the third output signal.

14. The projector according to claim 1, wherein the operational mode of the projector is a power-saving mode.

\* \* \* \* \*